United States Patent [19]

Kardos et al.

[11] Patent Number: 4,689,165

[45] Date of Patent: Aug. 25, 1987

[54] HEAT TRANSFER LIQUID

[75] Inventors: Péter Kardos; Tibor Kálmán; József Kerti; István Várnai, all of Budapest, Hungary

[73] Assignee: Komaromi Koolajipari Vallalat, Komarom, Hungary

[21] Appl. No.: 849,500

[22] PCT Filed: Jul. 18, 1985

[86] PCT No.: PCT/HU85/00046

§ 371 Date: Mar. 12, 1986

§ 102(e) Date: Mar. 12, 1986

[87] PCT Pub. No.: WO86/00917

PCT Pub. Date: Feb. 13, 1986

[30] Foreign Application Priority Data

Jul. 18, 1984 [HU] Hungary ............................ 2768/84

[51] Int. Cl.$^4$ .............................................. C09K 5/00
[52] U.S. Cl. ........................................ 252/75; 252/71; 252/74
[58] Field of Search ................ 252/71, 74, 75; 71/28, 71/30, 59, 61, 83, 99, 119, DIG. 4

[56] References Cited

U.S. PATENT DOCUMENTS 2,549,430  4/1951  Crittenden ...................... 71/DIG. 4
3,630,913  12/1971  Scott, Jr. et al. .................... 252/70
4,192,760  3/1980  Jünger ................................ 252/79

FOREIGN PATENT DOCUMENTS 3200349  7/1983  Fed. Rep. of Germany .

OTHER PUBLICATIONS

Weast, Ed., *The Handbook of Chemistry and Physics*, 55th Edition, 1974, CRC Press, Inc., p. D-114.

Primary Examiner—Robert A. Wax
Attorney, Agent, or Firm—Karl F. Ross; Herbert Dubno; Jonathan Myers

[57] ABSTRACT

The invention relates to a heat transfer liquid which comprises 2 to 12 parts by weight of water, at most 4 parts by weight of urea and/or formamide and/or dimethyl formamide, at most 7 parts by weight of ammonium nitrate and optionally ethylene glycol at most of the same volume than that of the above-listed components as major components with at most 0.3% by weight or by volume of corrosion inhibitors calculated for the total weight or volume of the liquid.

Using the heat transfer liquid of the invention the drawbacks derived from the application of glycol can be completely or in most part eliminated and a non-toxic heat-transfer liquid suitable for isopiestic drying can be also prepared.

3 Claims, No Drawings

HEAT TRANSFER LIQUID

FIELD OF THE INVENTION

The present invention relates to a widely usable heat transfer liquid composed of more components. The heat transfer liquid according to the invention can be used for cooling the internal combustion motors, and it is also useful for the environment saving operation of the cooling systems of thermal plants, industrial and household cooling and freezing machines, open and closed thermal sun collectors, chemical industrial duplicators and autoclaves and for isopiestic drying.

BACKGROUND OF THE INVENTION

Several kinds of heat transfer liquids are used in the industry. Water is applied everywhere where it can be used as water is cheap, is not harmful to the environment and health, is not inflammable, it has a moderate corrosive effect and its specific heat is high. A great disadvantage of its application is that its volume increases by about 9% upon freezing and damages the instruments. From the point of view of power plants requiring a great cooling capacity a further disadvantage, which is of greater importance in regions being deficient in water, is that it has a quite low boiling point; therefore it has a relatively high tension. Therefore the evaporation rate is high and consequently the undesired loss of water can be significant.

The relatively low boiling point can be also disadvantageous when as a result of the boiling of water, e.g. in solar collectors, in the cooling system of vehicles, serious operating trouble occurs. Therefore it is desirable to raise the temperature range in which the liquid can be applied, i.e. raise the boiling point.

A further disadvantage of water is that it cannot be used for isopiestic drying. Under the term "isopiestic drying" such a procedure is understood wherein the water content of a heat sensitive substance to be dried (e.g. corn, maize) is removed by the aid of a water absorptive liquid at ambient temperature. The substance to be dried and the liquid are kept in the same closed drying space, wherein the air is circulated by the aid of a ventilator. The water absorbed by the liquid is removed by the batch or continuous distillation of the liquid and the liquid is periodically or continously recycled to the drying space. Thus not only the undesired heating of the substance to be dried can be avoided, but a great amount of energy can also be saved compared to the technique of drying with warm air.

The freezing point can be decreased and the boiling point can be increased by mixing well-soluble compounds in water. These effects, the so-called cryoscopic effects can be multiplied if strong electrolytes are dissolved in water as their electrolytic dissociation in water results in an increase of the apparent concentration even in concentrated solutions. A widely used, well-soluble strong electrolyte dissociating into three ions is calcium chloride. A drawback of its use is that similar to the other chloride compounds, it quickly corrodes the metal structural elements especially if the operation temperature is periodically or continously high. A special disadvantage of the chloride ions is that they cause local corrosion (hole, slit or intercrystalline corrosion), therefore the instrument can become worn out in certain cases even if its wall is substantially intact. Similar problems arise when other chloride compounds are used, while the application of acidic and basic solutions is limited by health and environment protective prescriptions besides the corrosion problems.

The lower alcohols, ketones, hydrocarbons (e.g. petrol) and cyclohexanone are preferred from the point of view of their anti-freeze character, but they are inflammable, their vapors constitute a volatile mixture with water, most of them are toxic and have a low boiling point. Simultaneously, the compounds boiling at a lower temperature than water are inapt for isopiestic drying. A further drawback of the listed solvents is that their thermal capacity related to a mass unit (specific heat) is small (abot 30 to 40% of the specific heat of water). As their density is less than 1, their specific heat related to a mass unit is even smaller. This latter fact has practical importance because the heat transfer liquids are used in instruments of predetermined volume.

The aqueous ethylene glycol solution is widely used in practice as a heat transfer liquid due to its several advantages. Glycol is miscible with water at any rates, moderately inflammable and explosive, its specific heat is about two times higher than that of the listed organic compounds, colorless and relatively resistant to freezing. The specific heat the freezing point depend on the ratio of glycol and water, the former one increases, while the latter one decreases with the decrease of the water content. The lowest freezing point belongs to the eutectic composition which comprises 60% of glycol. A further advantage is that the volume of the glycol/water mixture does not increase upon freezing, therefore the instrument is not damaged.

However, the above-listed advantages are accompanied with some technical drawbacks which restrict the further usability of the glycol/water mixture even if the price of glycol is not considered. Ethylene glycol is highly toxic and as it can be easily confounded with ethanol, lethal intoxications have occurred. Due to its toxicity it pollutes the environment, therefore cannot be led to the waste water. On the other hand, its use is restricted by the fact that the consistency of the 1:1 mixture being important for practical reasons is nonthixothropically pulpy even at $-31°$ C. (though the freezing point of this mixture is $-38°$ C., therefore it cannot be pumped. Thus not only the freezing point of a mixture has to be taken into consideration but the relatively narrow temperature range wherein the mixture gains a non-thixotropic viscous consistency, further referred to as fluidity limit, is also of great importance from a practical points of view. The fluidity limit at $-31°$ C. cannot be changed by varying the glycol/water ration, therefore the glycol/water mixture cannot be used for heat transfer below $-31°$ C. The anti-freeze character and fluidity parameters of the mixture decline with the progress of time. As a result of the slow polymerization of glycol, the mixture has to be replaced by a fresh one, which is a further technological-economy drawback.

We targeted our efforts for working out a novel heat transfer liquid meeting the following demands:
its boiling point should be higher than that of water,
its specific heat should be similar to that of water,
its freezing point should be varied by changing the compositions, its fluidity limit should be decreased below $-31°$ C. in case of necessity,
its volume should not increase upon freezing,
it should be miscible with water at any ratio,
it should not be toxic, explosive and inflammable, it should not damage the environment,
it should be miscible with the glycol/water mixture, it should be inodorous (to avoid air pollution),
it should not be corrosive and its corrosive effect should not be greater than that of glycol/water mixture.

SUMMARY OF THE INVENTION

The heat transfer liquid according to the invention comprises water, urea and ammonium nitrate and optionally glycol the major components, wherein the weight ratio of urea and ammonium nitrate is between 1:1.50 to 1:2.00, preferably 1:1.75. The solution may further comprise a buffer in order to adjust the pH to 7.2-8.5 and a corrosion inhibitor for avoiding the corrosion of the metal structural elements.

DETAILED DESCRIPTION OF THE INVENTION

The theoretical basis of our invention is that the $-NH_2$ groups of certain water soluble amide compounds (e.g. formamide, urea, ethanol amine, phenylene diamines, dimethyl formamide or the mixture thereof) are susceptible to protonation, to form prototropic associates and hydrogen bonds in the presence of water and salts capable of forming acids upon hydrolysis, especially ammonium salts. If this protonation is accompanied with the formation of ammonium hydroxide, then oversalting occurs the amide compound and the amine salt hydrolyzing acidically mutually increase each other solubility. This effect is also used up in the course of the preparation of liquid fertilizers. When urea and ammonium nitrate are together dissolved in water, the concentrations of both urea and ammonium nitrate essentially exceed the saturation concentration of the aqueous urea and aqueous ammonium nitrate solutions in the thus obtained tertiary water/urea/ammonium nitrate solution, though chemical reaction has not occurred.

A further basis of our invention is the recognition that in the water/amide compound/ammonium salt, especially in the water/urea/ammonium nitrate system the properties of the solution cannot be predicted by simply adding the characteristic parameters of the different solutions. Thus not only the solubility conditions, but the freezing point, boiling point, fluidity limit and specific heat extraordinarily change especially if glycol is added to the solution as a fourth major component. In this latter case the solution will not be favorable from the point of view of environmental pollution, but the advantageous properties of the two liquid systems can be favorably combined. e.g. the fluidity limit can be essentially extended compared to the water/glycol system. On the other hand, if the heat transfer liquid comprising glycol is diluted with other inflammable and non-toxic solvents, the dangerous properties of glycol are decreased in direct ration of the dilution.

In our experiments we verified that the corrosive character of the urea/water/ammonium nitrate solution is smaller than that of the glycol/water system if the pH of the former solution is adjusted between a range of 7.2 to 8.5 and inhibitors, preferably additives comprising thiourea, alkyl polyglycol ester and/or hexamethylene tetramine as active ingredients are added in a concentration of 0.1 to 0.2, at most 0.3% by weight or by volume.

The solutions comprising the above-listed components meet the aims set. Simultaneously, the ratio of the components can be varied in wide concentration ranges, though the most preferable result is obtained from the point of view of freezing point and fluidity limit if the weight ratio of ammonium nitrate and urea is 1.50 to 2.00, preferably 1.75.

The invention is illustrated by the following non-limiting examples.

EXAMPLE 1

Heat transfer mixture suitable for isopiestic drying 2 parts by weight of water, 4 parts by weight of urea and 7 parts by weight of ammonium nitrate are mixed. As the dissolution is a strongly endothermic reaction, the process is carried out in a heatable duplicator equipped with a stirrer. The pH of the mixture is adjusted to 7.2 by adding potassium carbonate, thereafter 2.5 l of inhibitor of potassium hydrogenphosphate and hexamethylene tetramine are added calculated for 1 $m^3$ of the mixture. The properties of the thick, viscous liquid thus prepared are as follows:
freezing point: +7.5° C.,
boiling point: 123° C.,
density: 1348 kg/$m^3$ The liquid can be favorably used for isopiestic drying due to its high boiling point.

On the other hand, it is usable as an anti-freeze liquid if water is added as its freezing point quickly decreases upon adding of water. The mixture can directly be prepared at the site of the urea and ammonium nitrate production with sparing the expensive distillation steps. Anti-freeze solutions can be prepared by adding water and optionally glycol to the said mixture. The transport of the concentrate is more economic compared to the transport of the anti-freeze liquids comprising more water.

EXAMPLE 2

Glycol-free anti-freeze liquid

A solution comprising 8 parts by weight of water, 4 parts by weight of urea and 7 parts by weight of ammonium nitrate are prepared by the following two different manners: by directly mixing the individual components and by diluting the solution according to Example 1 with water. The additives listed in Example 1 are also mixed to the solution. The properties of the mixture thus obtained are as follows:
freezing point: −28.8° C.
fluidity limit: −28.8° C.
boiling point: 110.5° C.
density: 1234 kg/$m^3$ specific heat: 0.81 cal/°C.$cm^3$ (between 20° to 25° C.)

It has to be noted that the specific heat of the preferred 1:1 mixture of glycol/water is the same as that of the liquid prepared according to the example. The mixture according to the example does not comprise glycol, but its fluidity limit almost reaches the −31° C. which can be obtained when the glycol/water mixture of the most preferred ratio is employed.

Urea can partly or completely be substituted by other amide compounds listed hereinabove, preferably formamide, dimethyl formamide. Thus the properties of the liquid can be varied within wide ranges, e.g. the freezing point can be decreased below −30° C. However, such requirements arise only in special cases as anti-freeze liquids are rarely needed below −30° C.

The volume of the liquid according to the example does not increase upon freezing, and though the precipitating crystals do not jointlessly fill the space, they do not damage the metal wall of the instruments. The liquid is not toxic if it gets to the skin or into the mouth, and it can be used as a valuable fertilizer. It can optionally be mixed with phosphate and potassium compounds and can be transformed even into a combined fertilizer if it is removed from the instrument. Considering that generally there is no need for cooling around and below −30° C., the freezing of the mixture (if it does not damage the instrument) is not disadvantageous, while the melting of the mixture is endothermic and cools the system. In such cases the "heat transport" means the utilization of the latent heat as well as the environment being cooler than −30° C. dissipates the heat from the machine to be cooled operating at a higher temperature than −30° C.

If the freezing point and the fluidity limit has to be further decreased, i.e. the temperature range within the glycol/water mixture can be used should be expanded, this aim can also be achieved by the addition of glycol or a mixture of glycol and water as it is described by the further examples.

EXAMPLE 3

Anti-freeze cooling liquid comprising glycol

A mixture comprising 43.2 l of water, 28 l of glycol, 15.6 kg of urea and 27.3 kg of ammonium nitrate and additives as described in Example 1 is prepared. The same solution can be obtained if 28 parts by volume of glycol and 12 parts by volume of water are added to 60 parts by volume of the mixture according to Example 2. The properties of the mixture thus obtained are as follows:

freezing point: −38° C.
fluidity limit: −37° C.
boiling point: 112.5° C.
density: 1178 kg/m$^3$
specific heat: 0.64 cal/° C.cm$^3$ (between 20° to 25° C.

The mixture comprise 28% by volume of glycol. If a glycol/water mixture of the same freezing point was prepared, 50% by volume of glycol would be needed. However, the fluidity limit of the said glycol/water mixture would be only −31° C. even in this optimal case. The mixture of the invention simultaneously enables to decrease the fluidity limit and to space 22%, or 44% glycol compared to the conventional solutions. Certainly the drawbacks derived from the presence of glycol also diminish.

EXAMPLE 4

Super anti-freeze cooling liquid comprising glycol 39.9 l of water, 38.5 l of glycol, 11.7 kg of urea, 20.5 kg of ammonium nitrate and additives according to Example 1 are mixed. The same mixture can be achieved if 38.5 parts by volume of glycol and 16.5 parts by volume of water are mixed to 45 parts by volume of the liquid according Example 2. The properties of the mixture thus obtained are as follows:

freezing point: −48.5° C.
fluidity limit: −45.0° C.
boiling point: 113.0° C.
density: 1156 kg/m$^3$
specific heat: 0.75 cal/° C.cm$^3$ (between 20° to 25° C.)

It can be seen that upon decreasing of the freezing point the difference between the freezing point and fluidity limit gradually increases. If only the decrease of the freezing point is to be achieved without regard to the fluidity limit, then a freezing point of even −69° C. can be reached with a mixture prepared by adding 59.5 parts by volume of glycol and 25.5 parts by volume of water to 15 parts by volume of the mixture according Example 2. To the contrary, the lowest freezing point of the glycol/water mixture is −57° C. The freezing point of the glycol/water system of the eutectic composition can be diminished by about 12° C. with using of about the same amount of glycol, though the practical use of this system is restricted by fluidity problems.

The advantage of the heat transfer liquid of the invention is that the drawbacks derived from the use of glycol can be completely or in most part eliminated, while the freezing point and fluidity limit of the solution can significantly be decreased, thus the liquid can be used in a wider temperature range. Simultaneously a non-toxic heat transfer liquid suitable for isopiestic drying is found, thus not only a great amount of energy can be saved but the heating of heat sensitive substances can also be avoided.

We claim:

1. In an aqueous heat transfer liquid which includes 1.5 to 2 parts of ammonium nitrate per part of an amino compound selected from the group consisting of urea, formamide, and dimethyl formamide, the improvement which comprises: adding 0.1 to 0.3% by weight or volume of a corrosion inhibitor selected from the group consisting of thiourea, an alkyl-polyglycol ester, hexamethylene tetramine, and mixtures thereof.

2. The improvement defined in claim 1 wherein the pH of the aqueous heat transfer liquid is raised to a level of 7.2 to 8.5 by adding a buffer.

3. The improvement defined in claim 1 wherein the aqueous heat transfer liquid further comprises ethylene gylcol.

* * * * *